Feb. 27, 1945. L. W. WIGHTMAN 2,370,600
CENTRIFUGAL FAN
Filed Nov. 11, 1943

Inventor:
Lawrance W. Wightman,
by Harry E. Dunham
His Attorney.

Patented Feb. 27, 1945

2,370,600

UNITED STATES PATENT OFFICE 2,370,600

CENTRIFUGAL FAN

Lawrance W. Wightman, Fort Wayne, Ind., assignor to General Electric Company, a corporation of New York Application November 11, 1943, Serial No. 509,836

1 Claim. (Cl. 230—134)

The present invention relates to centrifugal fans and is particularly concerned with an arrangement for controlling the flow in accordance with speed. One application of the invention is to fans for circulating cooling fluid for variable speed motors where it is desirable that the flow at high speeds be reduced so the fans will not consume an unnecessary amount of power.

The object of my invention is to provide an improved construction and arrangement in centrifugal fans for controlling the flow in accordance with speed, and for a consideration of what I believe novel and my invention, attention is directed to the following description and the claim appended thereto.

Figure 1:
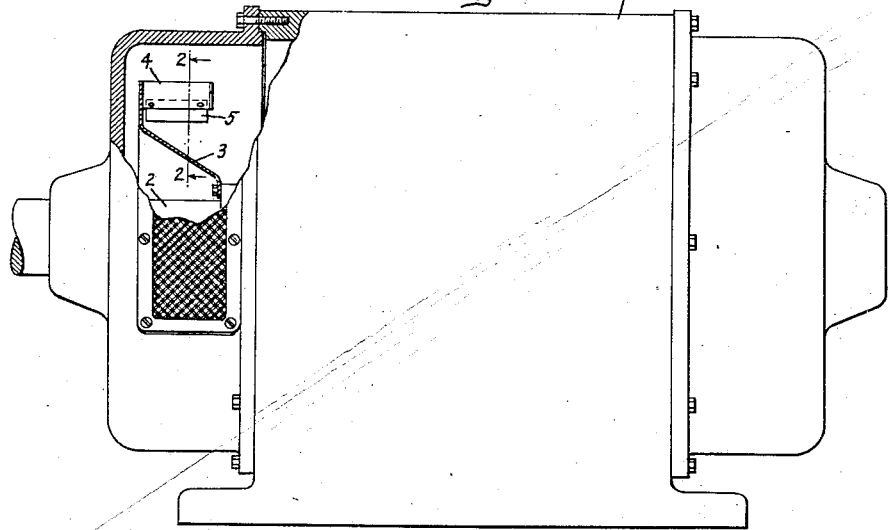
Figure 2:
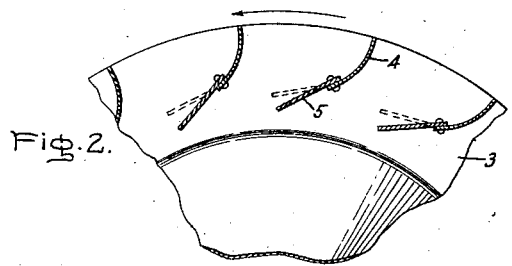
Figure 3:
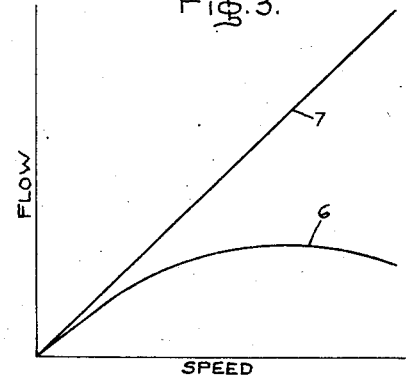

In the accompanying drawing, Fig. 1 is an elevation of a variable speed motor partially broken away to show the cooling fan; Fig. 2 is a section on line 2—2 of Fig. 1; and Fig. 3 is a fan performance diagram.

Referring to the drawing, there is shown a variable speed electric motor 1 having fixed on its shaft 2 an impeller 3 for circulating cooling air through the motor. As shown in Fig. 2, the impeller has rigid blades 4 at the inner or intake ends of which are riveted resilient vanes 5 which define the intake passages to the impeller. When the impeller is at rest, the vanes occupy the full line positions and the intake passages to the impeller are of greatest area. During rotation, centrifugal force causes the vanes to flex toward the dotted line position an amount proportional to the impeller speed producing a corresponding restriction in the impeller intake passages which decreases the flow from that which would exist if the vanes 5 were omitted. This is illustrated in Fig. 3, a plot of flow against speed, in which lines 6 and 7 respectively represent the performance of the impeller with and without the vanes 5.

The fan performance represented by line 6 is particularly adapted to the circulation of cooling fluid for variable speed motors. The normal fan performance represented by line 7 causes the circulation of an unnecessarily large volume of coolant at high motor speeds with a resultant lowering in the overall motor efficiency. By choosing the stiffness and initial slant of the vanes 5 it is possible to match the impeller flow characteristics to the need for motor coolant. The portion of the impeller characteristic used will depend upon the needs of the motor. For example, if the need for coolant increased with motor speed, the vanes 5 would be designed so that only the rising portion of the impeller characteristic was used. On the other hand, if the motor only operated at high speeds under light load, the vanes 5 would be more resilient so that the impeller operated on the drooping portion of its characteristic at these high speeds. For a motor of constant power output at variable speeds, the vanes 5 would be designed so that the impeller operates at the center of its characteristic.

What I claim as new and desire to secure by Letters Patent of the United States is:

An impeller comprising a side wall, circumferentially spaced axially extending rigid blades attached to said side wall, and resilient vanes radially attached at their radially outer edges to the radially inner edges of said blades to form continuations thereof, said vanes being flexed by centrifugal force to vary the area of the inlet passages to the blades in accordance with the impeller speed.

LAWRANCE W. WIGHTMAN.